US007760100B2

(12) United States Patent
August et al.

(10) Patent No.: US 7,760,100 B2
(45) Date of Patent: Jul. 20, 2010

(54) SYSTEMS AND METHODS FOR STORING AND TRANSFERRING PERSONAL DATA

(76) Inventors: Clifford J. August, 20 West 18th Avenue, Vancouver, British Columbia (CA) V5Y 2A4; Henry Hon-Yiu Leung, #13-2865 Glen Drive, Coquitlam, British Columbia (CA) V3B 6W1; Thomas Heinrich Sternberg, 7924-119B Street, Delta, British Columbia (CA) V4C 8B1

( * ) Notice: Subject to any disclaimer, the term of this patent is extended or adjusted under 35 U.S.C. 154(b) by 898 days.

(21) Appl. No.: 11/583,523

(22) Filed: Oct. 18, 2006

(65) Prior Publication Data

US 2007/0084711 A1 Apr. 19, 2007

Related U.S. Application Data

(60) Provisional application No. 60/727,385, filed on Oct. 18, 2005, provisional application No. 60/727,390, filed on Oct. 18, 2005, provisional application No. 60/727,391, filed on Oct. 18, 2005, provisional application No. 60/727,392, filed on Oct. 18, 2005.

(51) Int. Cl.
    *G08B 13/14* (2006.01)
(52) U.S. Cl. .................. 340/572.8; 340/10.1; 340/5.62; 340/571
(58) Field of Classification Search ................. 340/636, 340/825, 572.8, 10.1, 571, 5.62; 320/114, 320/115; 379/216.01; 341/22; 710/302, 710/303, 304
    See application file for complete search history.

(56) References Cited

U.S. PATENT DOCUMENTS

| | | | |
|---|---|---|---|
| 4,165,575 A * | 8/1979 | Neilsen ........................ 40/379 |
| 5,098,633 A * | 3/1992 | Hausler ....................... 264/511 |
| 5,793,359 A | 8/1998 | Ushikubo | |
| 6,013,949 A * | 1/2000 | Tuttle ......................... 257/723 |
| 6,213,879 B1 | 4/2001 | Niizuma et al. | |
| 6,285,295 B1 | 9/2001 | Casden | |
| 6,501,036 B2 | 12/2002 | Rochon et al. | |
| 6,650,254 B1 | 11/2003 | Rix | |
| 6,903,662 B2 * | 6/2005 | Rix et al. ...................... 341/22 |
| 6,940,974 B2 | 9/2005 | August et al. | |
| 6,961,425 B2 | 11/2005 | August | |
| 7,157,651 B2 | 1/2007 | Rix et al. | |
| 7,570,166 B2 * | 8/2009 | Alden et al. ............. 340/572.1 |
| 2002/0167500 A1 * | 11/2002 | Gelbman ..................... 345/204 |
| 2003/0016136 A1 * | 1/2003 | Harvey .................... 340/686.1 |
| 2004/0113892 A1 * | 6/2004 | Mears et al. ................ 345/172 |
| 2005/0075169 A1 | 4/2005 | Cheng et al. | |
| 2006/0192018 A1 * | 8/2006 | Tsai et al. ................... 235/492 |
| 2006/0289657 A1 * | 12/2006 | Rosenberg ................. 235/492 |
| 2007/0234215 A1 * | 10/2007 | Graham et al. ............. 715/723 |
| 2008/0195641 A1 | 8/2008 | Tischer et al. | |

* cited by examiner

*Primary Examiner*—Daniel Wu
*Assistant Examiner*—Rufus Point
(74) *Attorney, Agent, or Firm*—Michael R. Schacht; Schacht Law Office, Inc.

(57) ABSTRACT

A button assembly for exchanging data comprising a button housing assembly, a circuit board, a switch element, and an actuator member. The circuit board is arranged within the button housing assembly. The circuit board stores data. The switch element is mounted on the circuit board. The actuator member is supported on the button housing assembly. Application of a force to the actuator member causes the actuator member to engage the switch element and form an antenna circuit. The data on the circuit board can be downloaded when the antenna circuit is formed.

11 Claims, 5 Drawing Sheets

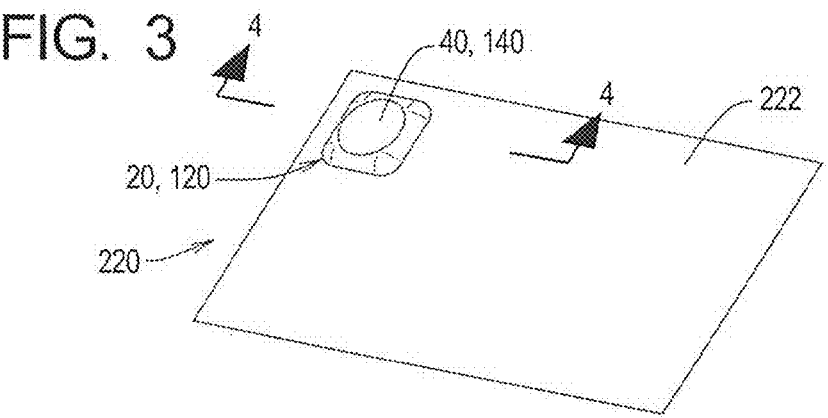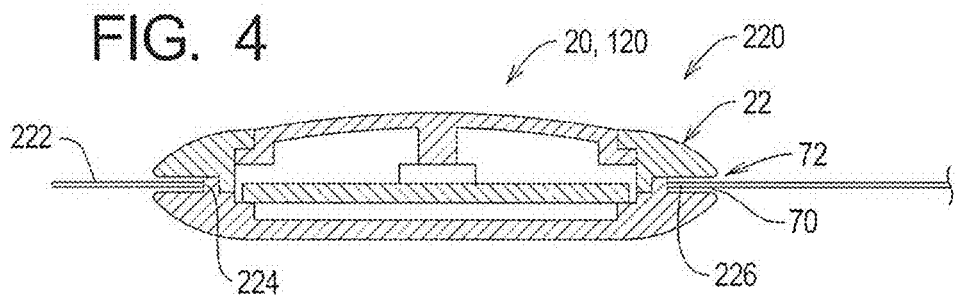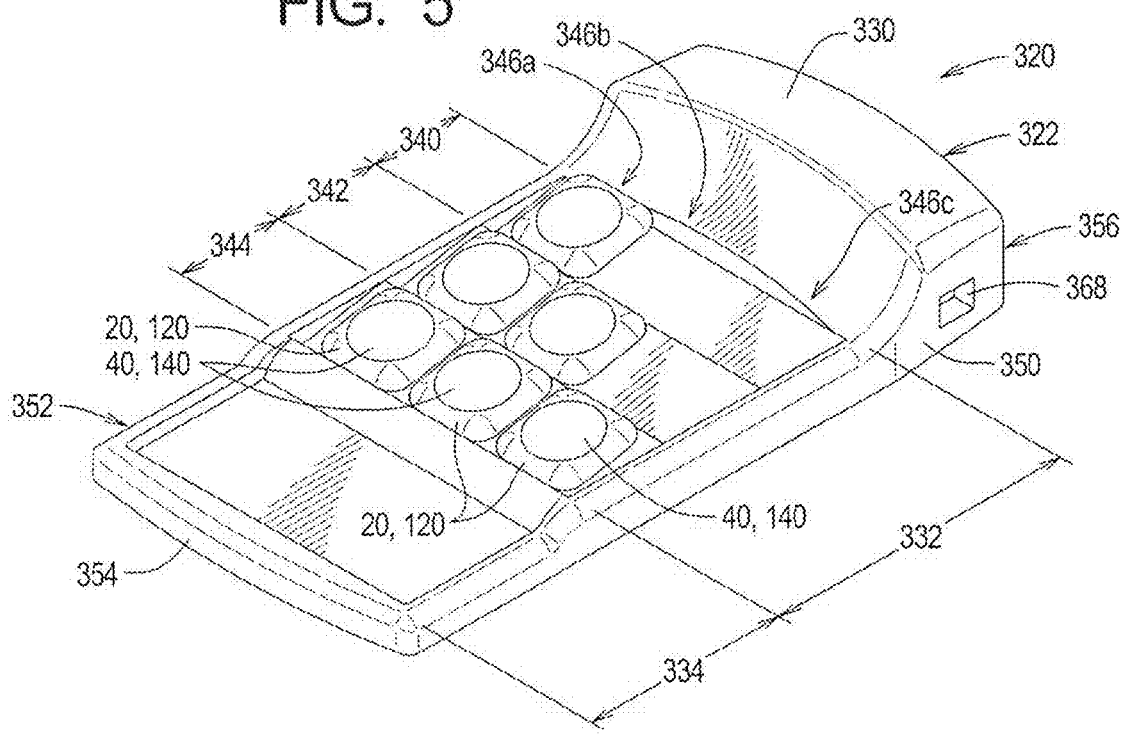

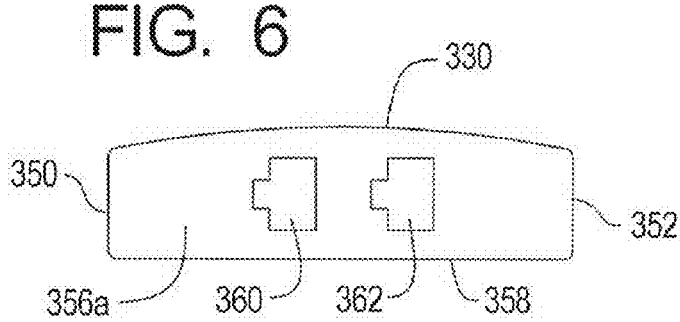
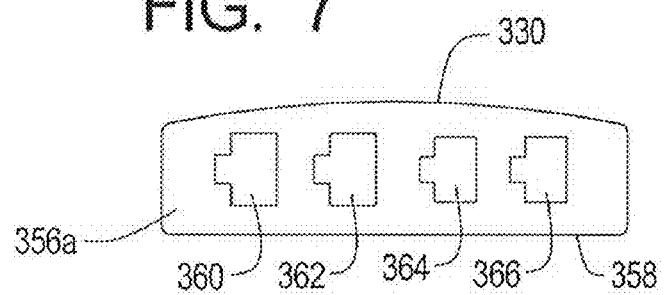
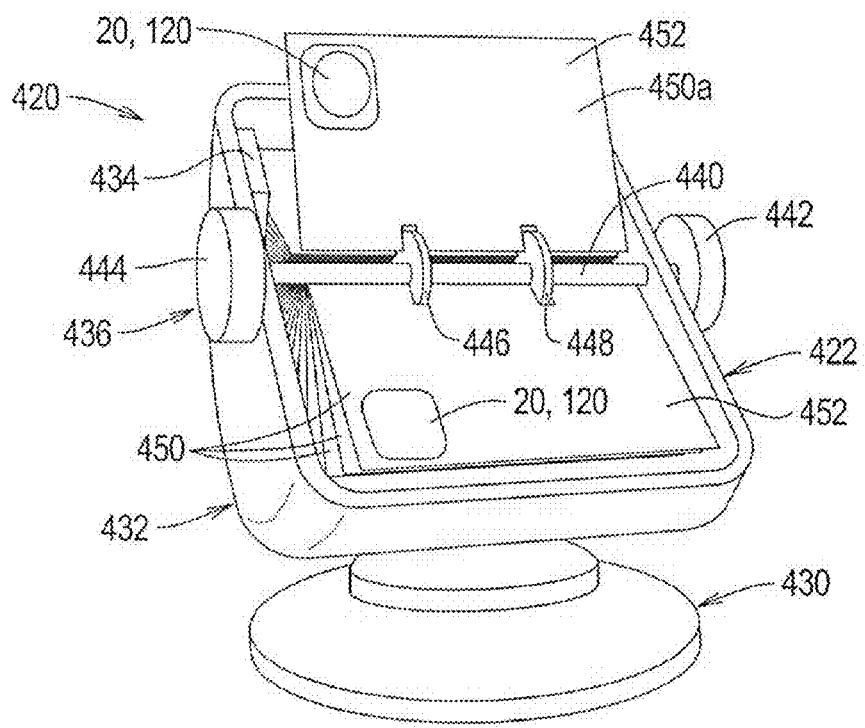

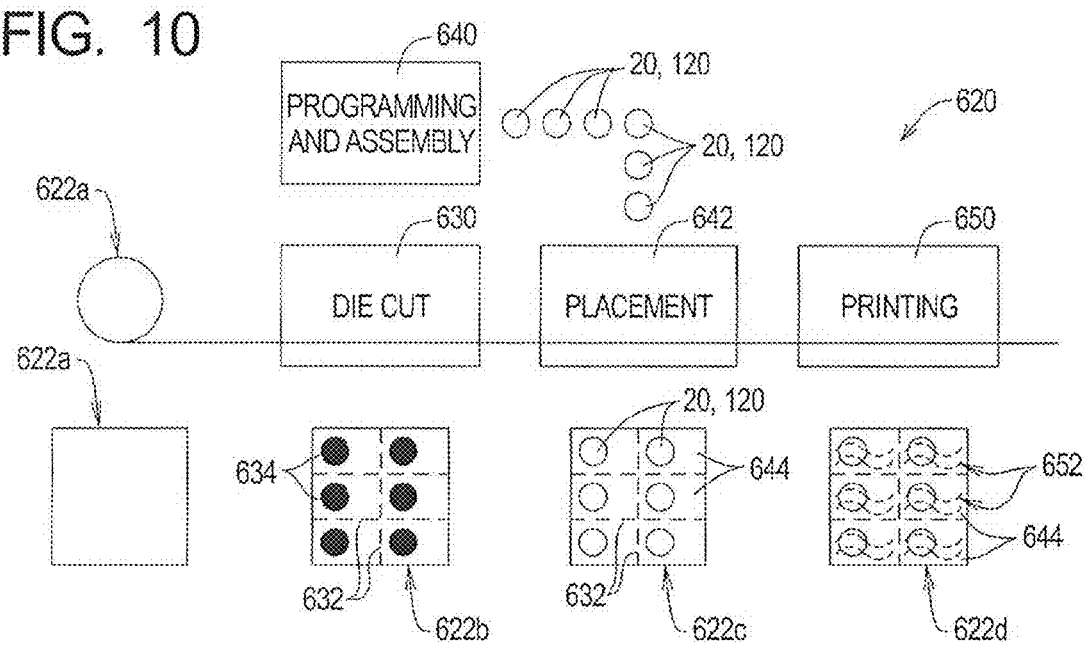

SYSTEMS AND METHODS FOR STORING AND TRANSFERRING PERSONAL DATA

RELATED APPLICATIONS

This application claims priority of U.S. Provisional Patent Application Ser. Nos. 60/727,385 filed Oct. 18, 2005, 60/727,390 filed Oct. 18, 2005, 60/727,391 filed Oct. 18, 2005, and 60/727,392 filed Oct. 18, 2005, the contents of which are incorporated herein by reference.

TECHNICAL FIELD

The present invention relates to data storage systems and, in particular, data storage systems that allow data to be stored and transferred to a host device using radio frequency identification (RFID) data transmission.

BACKGROUND OF THE INVENTION

RFID systems are becoming ubiquitous in everyday life. An RFID system contains two basic elements: a tag unit and an interrogator unit. The tag unit typically comprises an IC and an antenna. The IC comprises memory and processing circuitry. The interrogator unit contains an RF transceiver, processing circuitry, and an antenna. Power to the tag IC may be provided by the interrogator unit, so the tag unit need not contain a power storage system such as a battery. A tag unit that does not contain a power storage system is referred to as a passive tag unit. The interrogator portion may generate a signal that activates any tag unit within reach of the signal. When activated, any tag unit within signal reach transmits any data stored on the memory to the interrogator unit.

In may contexts, the data stored by a tag unit is not confidential. However, in other contexts, it may be desirable to limit access to the data stored on a tag unit. The present invention relates to RFID systems and methods designed to limit access to data stored on a tag unit.

The present invention is of particular significance in the context of a button assembly that stores personal information such as telephone numbers, addresses, and the like. The present invention will thus be described herein in the context of RFID systems and methods that allow personal data to be transmitted from a button assembly to an electronic device such as a telephone or computer for storage and/or further processing. However, the principles of the present invention may have broader application, and the principles of the present invention should be determined by the claims appended hereto and not the following detailed description of the invention.

SUMMARY OF THE INVENTION

The present invention may be embodied as a button assembly for exchanging data comprising a button housing assembly, a circuit board, a switch element, and an actuator member. The circuit board is arranged within the button housing assembly. The circuit board stores data. The switch element is mounted on the circuit board. The actuator member is supported on the button housing assembly. Application of a force to the actuator member causes the actuator member to engage the switch element and form an antenna circuit. The data on the circuit board can be downloaded when the antenna circuit is formed.

The present invention may also be embodied as a dock assembly for exchanging data comprising a dock housing assembly and at least one port. The dock housing assembly defines at least one dock coil location. The at least one port allows data to be transferred out of the dock assembly. At least one data storage device is arranged adjacent to the at least one dock coil location to exchange data between the dock assembly and the data storage element.

The present invention may also be embodied as a data storage assembly for exchanging data comprising a substrate and a button assembly attached to the substrate. The button assembly comprises a button housing assembly, a circuit board, a switch element, and an actuator member. The circuit board is arranged within the button housing assembly. The circuit board stores data. The switch element is mounted on the circuit board. The actuator member is supported on the button housing assembly. Application of a force to the actuator member causes the actuator member to engage the switch element and form an antenna circuit. The data on the circuit board can be downloaded when the antenna circuit is formed.

BRIEF DESCRIPTION OF THE DRAWINGS

FIG. 3 is a perspective view of an example card assembly employing a button assembly such that as that depicted in FIG. 1;

FIG. 4 is a side elevation cut-away view of the card assembly depicted in FIG. 3;

FIG. 5 is an elevation view of a first embodiment of a dock assembly for obtaining data from one or more button assemblies such as those depicted in FIG. 1;

FIG. 6 is an end elevation view of the first embodiment of the dock assembly depicted in FIG. 5;

FIG. 7 is an end elevation view of a second embodiment of a dock assembly similar to the one depicted in FIG. 5;

FIG. 8 is a perspective view of a third embodiment of a dock assembly for obtaining data from one or more of the button assemblies such as those depicted in FIG. 1;

FIG. 10 is a highly schematic representation of one example manufacturing system that may be used to fabricate a card assembly such as that depicted in FIGS. 3 and 4.

DETAILED DESCRIPTION OF THE INVENTION

Figure 1:
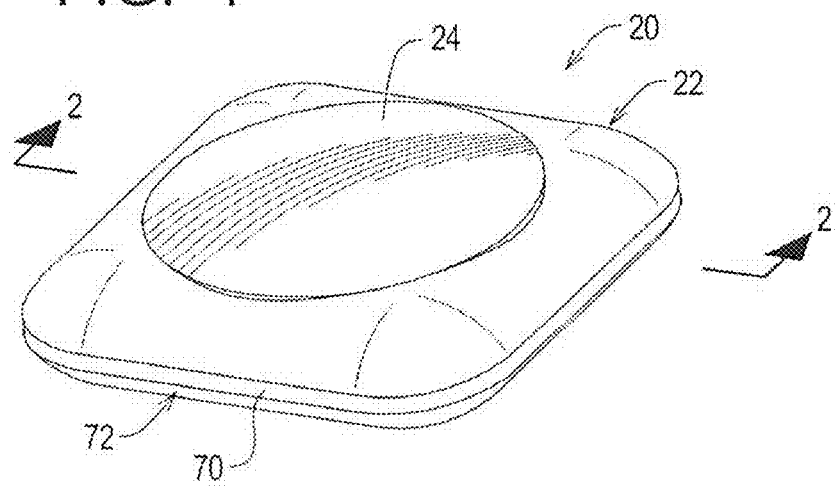
FIG. 1 is a perspective view of an example button assembly constructed in accordance with, and embodying, the principles of the present invention.
Figure 2A:
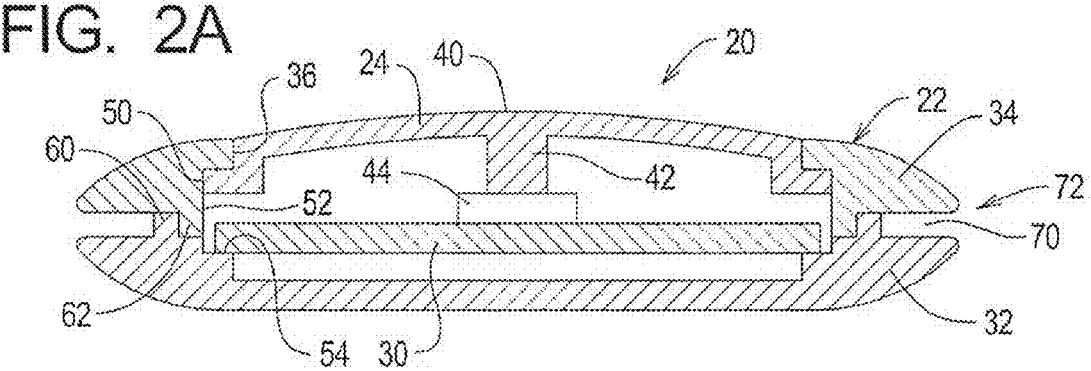
FIG. 2A is a side elevation cut-away view of the button assembly depicted in FIG. 1.

Referring initially to FIGS. 1 and 2A of the drawing, depicted at 20 therein is a first example button assembly constructed in accordance with, and embodying, the principles of the present invention. The first example button assembly 20 comprises a housing assembly 22 and actuator member 24. As shown in FIG. 2A, the first example button assembly 22 further comprises a circuit board 30, and the housing assembly 22 comprises a first housing member 32 and a second housing member 34.

FIG. 2A also illustrates that the second housing member 34 defines an actuator opening 36 and that the actuator member 24 comprises an exposed surface 40 and an actuator projection 42. The example circuit board 30 defines a switch element 44.

The first example button assembly 20 is assembled as follows. The circuit board 30 is initially placed in the first housing member 32. The actuator member 24 is then arranged within the actuator opening 36 defined by the second housing member 34. The first and second housing members 32 and 36 are then joined together as shown in FIG. 2A such that the actuator projection 42 is in contact with the switch element 44.

In use, applying a pressure to the exposed surface 40 causes the actuator projection 42 to engage the switch element 44 to cause an electrical switch to close and form an antenna circuit as generally described in the Applicant's copending application Ser. No. 11/583,461, the specification of which is incorporated herein by reference.

The circuit board 30 contains data that is accessible only when pressure is applied to the exposed surface 40 of the actuator member 24 to form the antenna circuit. The circuit board 30 may be preprogrammed with data using electrical contacts or RFID techniques prior to formation of the button assembly 20 or may be programmed using conventional RFID techniques after the button assembly 20 has been formed.

Referring for a moment back to FIG. 2A, it can be seen that a perimeter surface 50 of the actuator member 24 engages a guide surface 52 defined by the second housing member 34 to guide the actuator member 24 between released and depressed positions relative to the housing assembly 22. In addition, as is conventional, the switch element 44 resiliently opposes movement of the actuator member 24 from the released position to the depressed position. The switch element 44 thus biases the actuator member 24 into the released position, but this bias can be overcome by the deliberate application of manual pressure to the exposed surface 40.

In the example, button assembly 20, the first housing member 32 defines a board support surface 54 on which the circuit board 30 is placed. The engagement of the actuator projection 42 with the switch element 44 forces the circuit board 30 against the board support surface 54 to hold the circuit board 30 in place within the housing assembly 22.

FIG. 2A further shows that the first and second housing members 32 and 34 define overlapping projections 60 and 62, respectively. These projections 60 and 62 may extend around the entire periphery of the housing members 32 and 34 or may be formed at discrete locations around the periphery. In either case, the projections 60 and 62 are configured to engage each other to secure the first and second housing members 32 and 34 together to form the housing assembly 22 as shown in FIG. 2A. The projections 60 and 62 may frictionally engage each other, and/or adhesive or other means may be applied at the juncture of the first and second projections 60 and 62 to create a more rigid bond between these first and second projections 60 and 62.

FIG. 2A also shows that, when the example first and second housing members 32 and 34 are joined together to form the housing assembly 22, a perimeter gap 70 is formed that extends at least partly around a perimeter edge 72 of the housing assembly 22. The purpose of the perimeter gap 70 will be described in further detail below.

Figure 2B:
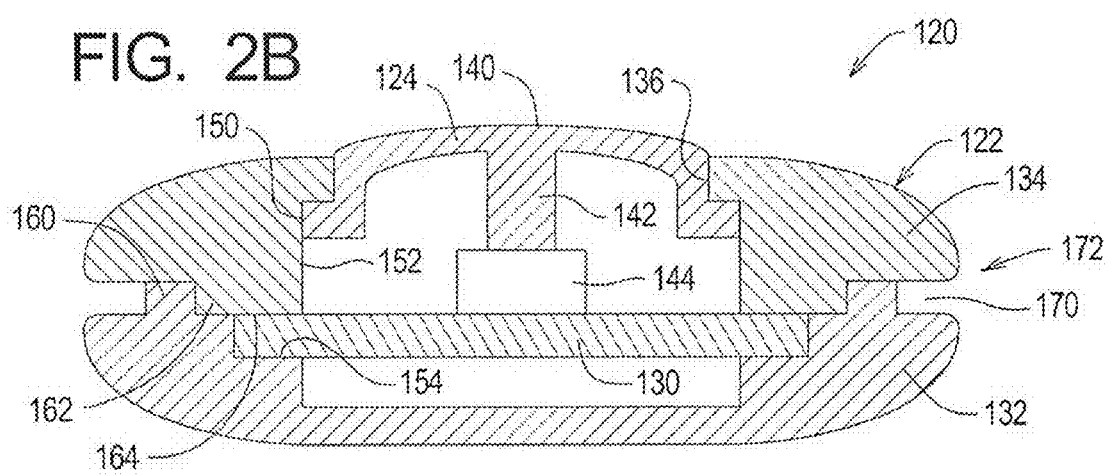
FIG. 2B is a side elevation cut-away view of a second example button assembly of the present invention.

Referring now for a moment to FIG. 2B, depicted therein is a second example button assembly 120 constructed in accordance with, and embodying, the principles of the present invention. Like the first button assembly 120, the second example button assembly 120 comprises a housing assembly 122 and actuator member 124. As shown in FIG. 2B, the first example button assembly 122 further comprises a circuit board 130, and the housing assembly 122 comprises a first housing member 132 and a second housing member 134.

FIG. 2B illustrates that the second housing member 134 defines an actuator opening 136 and that the actuator member 124 comprises an exposed surface 140 and an actuator projection 142. The example circuit board 130 defines a switch element 144.

The second example button assembly 120 is assembled as follows. The circuit board 130 is initially placed in the first housing member 132. The actuator member 124 is then arranged within the actuator opening 136 defined by the second housing member 134. The first and second housing members 132 and 134 are then joined together as shown in FIG. 2B such that the actuator projection 142 is in contact with the switch element 144.

In use, applying a pressure to the exposed surface 140 causes the actuator projection 142 to engage the switch element 144 to cause an electrical switch to close and form an antenna circuit. Again, a system for forming such an antenna circuit is described in more detail in the Applicant's copending application Ser. No. 11/583,461.

The circuit board 130 contains data that is accessible only when pressure is applied to the exposed surface 140 of the actuator member 124 to form the antenna circuit. The circuit board 130 may be preprogrammed with data using electrical contacts or RFID techniques prior to formation of the button assembly 120 or may be programmed using conventional RFID techniques after the button assembly 120 has been formed.

Referring for a moment back to FIG. 2B, it can be seen that a perimeter surface 150 of the actuator member 124 engages a guide surface 152 defined by the second housing member 134 to guide the actuator member 124 between released and depressed positions relative to the housing assembly 122. In addition, as is conventional, the switch element 144 resiliently opposes movement of the actuator member 124 from the released position to the depressed position. The switch element 144 thus biases the actuator member 124 into the released position, but this bias can be overcome by the deliberate application of manual pressure to the exposed surface 140.

In the example button assembly 120, the first housing member 132 defines a board support surface 154 on which the circuit board 130 is placed during assembly of the button assembly 120.

FIG. 2B further shows that the first and second housing members 132 and 134 define overlapping projections 160 and 162, respectively. These projections 160 and 162 may extend around the entire periphery of the housing members 132 and 134 or may be formed at discrete locations around the periphery. In either case, the projections 160 and 162 are configured to engage each other to secure the first and second housing members 132 and 134 together to form the housing assembly 122 as shown in FIG. 2B. The projections 160 and 162 may frictionally engage each other, and/or adhesive or other means may be applied at the juncture of the first and second projections 160 and 162 to create a more rigid bond between these first and second projections 160 and 162.

In the example, button assembly 120, the projection 162 on the second housing member 134 defines a board capture surface 164. When the first and second housing members 132 and 134 are joined together, the board capture surface 164 overlaps at least a portion of the perimeter of the circuit board 130 to hold the circuit board 130 against the board support surface 154. The circuit board 130 is thus firmly clamped between the first and second housing members 132 and 134.

FIG. 2B also shows that, when the example first and second housing members 132 and 134 are joined together to form the housing assembly 122, a perimeter gap 170 is formed that extends at least partly around a perimeter edge 172 of the housing assembly 122. The purpose of the perimeter gap 170 will become apparent from the following discussion.

FIGS. 2A and 2B illustrate that the housing assemblies 22 and 122 of the example button assemblies 20 and 120 define perimeter gaps 70 and 170, respectively. These perimeter gaps 70 and 170 facilitate the attachment of the button assemblies 22 and 122 to a substrate such as a business card, rolodex card, credit card, or the like.

In particular, FIG. 3 illustrates card assembly 220 comprising one of the button assemblies 20 or 120 and a business card 222. The button assembly 20, 120 is attached to the business card 222 such that the exposed surface 40, 140 is accessible. Accordingly, the button assembly 20, 120 may be distributed in a manner similar to a conventional business card, but the card assembly 220 has the advantage of having the telephone and/or other personal information stored thereon. The button assembly 20, 120 may be used while still attached to the business card 222 or may be detached from the business card 222 and used separately.

FIG. 4 illustrates that the business card 222 defines a card opening 224 into which a portion of the button assembly 20 is inserted. When the portion of the button assembly 20 is inserted into the card opening 224, an edge portion 226 of the business card 222 is received within the perimeter gap 70 defined by the button assembly 20. The housing assembly 22 thus mechanically secures the button assembly 20 to the business card 222. The button assembly 120 would be attached to the business card 222 in a similar manner.

More generally, the button assemblies 20 and 120 may be attached to a substrate such as liquid adhesives, pressure sensitive materials, or any other system for bonding two items together. In this context, it should be apparent that certain bonding systems obviate the need for forming a card opening 224 for receiving the button assembly 20, 120.

FIG. 5 depicts a first example dock assembly 320 that may be used in connection with the button assemblies 20 and 120 described above. The example dock assembly 320 comprises a housing assembly 322 defining first, second, and third upper main surface portions 330, 332, and 334. The second upper main surface portion 332 defines first, second, and third dock surface portions 340, 342, and 344. The dock surface portions 340, 342, and 344 in turn each define three button positions 346a, 346b, and 346c.

As shown in FIG. 5, one or more of the button assemblies 20, 120 are arranged at any of the button positions 346a-c of the dock surface portions 340, 342, and 344. The example dock assembly 320 thus defines nine button positions, and six of these are occupied and three are unoccupied in the example configuration shown in FIG. 5. Associated with each of the button positions 346a-c is a dock coil (not shown in FIG. 5) that may be used to obtain data from the circuit board 30 using conventional RFID techniques as defined in the copending application Ser. No. 11/583,461 cited above.

The data extracted from the circuit board 30 may correspond to at least a telephone number or a portion of a telephone number. In addition to telephone number data, the extracted data may further contain personal information such as individual name, company name, address, songs, video clips, audio clips, resume data, playlist data, email address, website address, and the like.

FIG. 5 further illustrates that the housing assembly 322 defines first and second side surfaces 350 and 352, a front surface 354, a rear surface 356, and a bottom surface 358. FIG. 6 illustrates an example rear surface 356a in which first and second telephony jacks 360 and 362 are formed. FIG. 7 illustrates a second example rear surface 356b comprising the first and second telephony jacks 360 and 362 and first and second handset jacks 364 and 366. FIG. 5 illustrates a USB port 368 formed in the first side surface 350. The exact configuration and location of these various jacks 360-366 and port 368 is not important, but placement towards the rear of the housing assembly 322 as shown in FIG. 5 tends to allow cables connected to these jacks and ports to be kept out of the way.

The surface portions 330 and 334 may be imprinted with text and/or graphics that allow the space defined by these surface portions 330 an 334 to be used for advertising purposes.

FIG. 8 depicts a second example dock assembly 420 that may be used in connection with the button assemblies 20 and 120 described above. The example dock assembly 420 comprises a housing assembly 422 defining a base portion 430 and a cover portion 432, and a coil projection 434. The dock assembly 420 further comprises an axle assembly 436 rotatably mounted to the cover portion 432. The axle assembly 436 comprises an axle member 440, first and second thumb wheels 442 and 444, and first and second card wheels 446 and 448.

It will be recognized that the dock assembly 420 is in the form of a conventional card holder such as is available from Rolodex. As shown in FIG. 8, the card wheels 446 and 448 support one or more card assemblies 450 comprising a card substrate 452 and one or more of the button members 20 and/or 120. The axle assembly 436 may thus be used to rotate a selected one of the card assemblies 450a into an access position where the card substrate 452 can be viewed and the button assembly 20, 120 activated.

When the selected card assembly 450a is in the access position, the button assembly 20, 120 attached to the selected card assembly 450a is adjacent to the coil projection 434. As described in copending U.S. application Ser. No. 11/583,461, a dock coil (not shown) forming part of an interrogator unit is arranged within the coil projection 434. Accordingly, when the button assembly 20, 120 is activated, the interrogator unit can exchange data with the circuit board 30, 130 on the button assembly 20, 120.

While not shown in FIG. 8, the housing assembly 422 may be provided with telephony jacks, handset jacks, and a USB port. The exact configuration and location of these various jacks and port is not important, but placement towards the rear of the housing assembly 422 allows cables connected to these jacks and ports to be kept out of the way.

Referring now to FIGS. 9A-9D, several configurations of a jacks and ports are shown forming part of a generic dock assembly, along with the host devices connected to these jacks and/or ports.

Figure 9A:
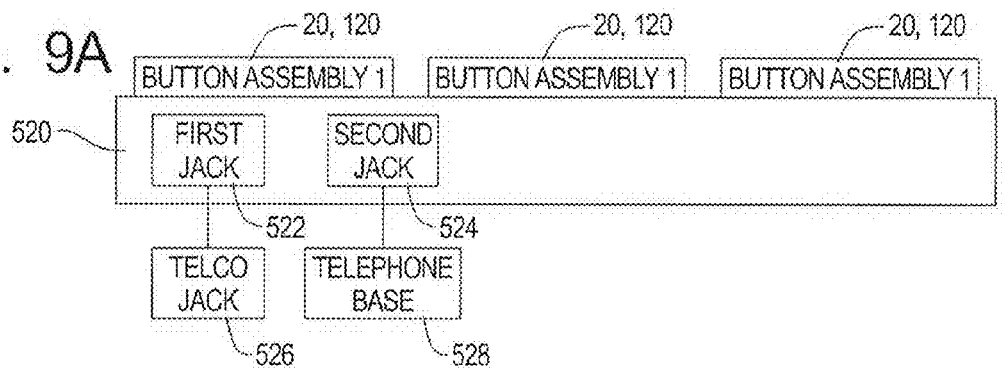
FIGS. 9A-D are block diagrams illustrating four different configurations of dock assemblies for obtaining data from one or more button assemblies such as those depicted in FIG. 1.

In FIG. 9A, a dock assembly 520 is shown with first and second telephony jacks 522 and 524 that are in turn connected to a standard TELCO wall jack 526 and telephone unit 528 in a conventional manner.

Figure 9B:
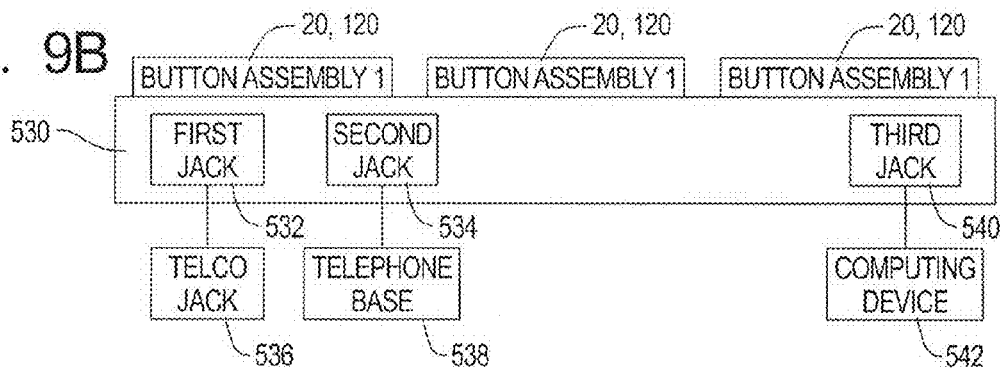

In FIG. 9B, a dock assembly 530 is shown with first and second jacks 532 and 534 adapted to be connected to a standard TELCO wall jack 536 and telephone unit 538 in a conventional manner. The dock assembly 530 further comprises a USB port 540 adapted to be connected to a computing device 542 in a conventional manner. The computing device may be a general purpose computer, personal digital assistant, cellular telephone, camera, MP3 player, a video player, or any other device capable of receiving digital data. In the case of a computing device that runs a web browser, the computing device 542 can be configured to cause the browser to go to a web address stored by the button assemblies 20, 120.

Figure 9C:
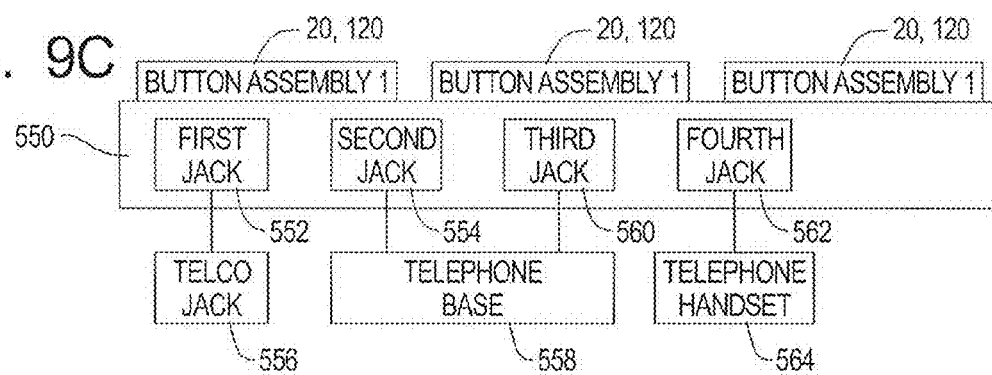

In FIG. 9C, a dock assembly 550 is shown with first and second jacks 552 and 554 adapted to be connected to a standard TELCO wall jack 556 and telephone base unit 558 in a conventional manner. The dock assembly 530 further comprises first and second handset jacks 560 and 562 that are adapted to be connected to the telephone base unit 558 and a telephone handset 564.

Figure 9D:
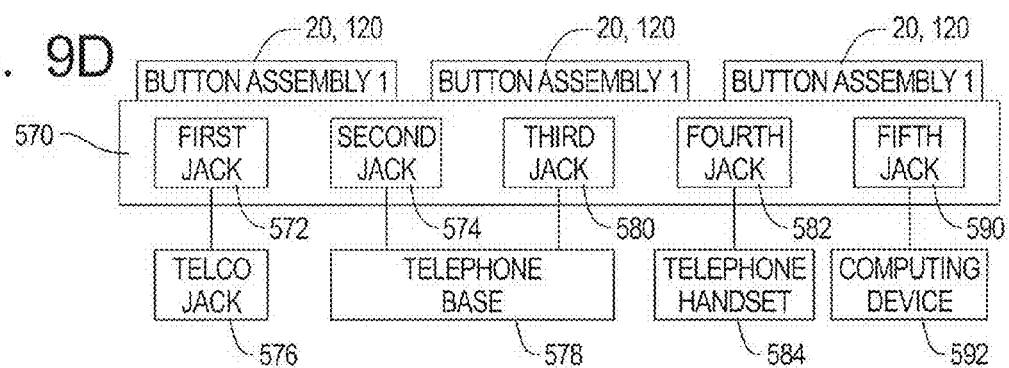

In FIG. 9D, a dock assembly 570 is shown with first and second jacks 572 and 574 adapted to be connected to a standard TELCO wall jack 576 and telephone base unit 578 in a conventional manner. The dock assembly 570 further comprises first and second handset jacks 580 and 582 that are adapted to be connected to the telephone base unit 578 and a telephone handset 584. The dock assembly 570 further comprises a USB port 590 adapted to be connected to a computing device 592 in a conventional manner.

Referring now to FIG. 10 of the drawing, depicted at 620 therein is an example of a manufacturing process that may be used to manufacture card assemblies such as the card assemblies 220 and 450 described above. Initially, card stock is provided as shown at 622a. The card stock 622a may be blank or may be preprinted in whole or in part. The example card stock 622 is shown in roll form, but the card stock may also be provided in sheet form.

The card stock 622a is then die cut at a step 630 to obtain cut card stock 622b. The example cut card stock 622b defines perforations 632 and button openings 634. At a step 640, button assemblies such as the button assemblies 20 and 120 are provided. In the step 640, the button assemblies 20, 120 are preprogrammed, but the programming may be performed at a later time. In addition, the button assemblies 20, 120 may be pre-printed with graphics, words, colors, or the like. In the example system 620, the button assemblies 20, 120 are printed later as will be described below.

At a step 642, the button assemblies 20, 120 are placed partly into the button openings 634 to form card assemblies 644 such as the card assemblies 220 and 450 described above. At this point, the card assemblies 644 are still connected as part of assembly card stock 622c.

At a step 650, one or more images 652 are formed on the assembly card stock 622c to obtain printed card stock 622d. The images 652 may be the same on each card assembly 644 as shown in FIG. 10 or may different for each card assembly 644. As shown in FIG. 10, the images 652 are formed both on the card stock and on the button assemblies.

At that point, the card assemblies 644 may be separated along the perforations or shipped in sheet or roll form. If no perforations were formed, the card stock 622 may be cut to obtain the individual card assemblies 644.

We claim:

1. A button assembly for exchanging data, comprising:
a card having a card opening defined thereon;
a button housing assembly defining a perimeter clap;
a circuit board arranged within the button housing assembly, where the circuit board stores data;
a switch element mounted on the circuit board;
an actuator member supported on the button housing assembly, where application of a force to the actuator member causes the actuator member to engage the switch element and form an antenna circuit; whereby the data on the circuit board can be downloaded when the antenna circuit is formed; and
the button housing assembly is arranged within the card opening such that a card opening edge portion is received within the perimeter gap to mechanically secure the button assembly to the card.

2. A button assembly as recited in claim 1, in which:
the button housing assembly comprises first and second housing members;
an actuator opening is formed in the second housing member; and
an exposed surface of the actuator member is accessible through the actuator opening to facilitate application of the force to the actuator member.

3. A button assembly as recited in claim 1, in which:
the button housing assembly comprises first and second housing members;
a support surface is formed on the first housing member; and
the circuit board is supported within the housing at least in part by the support surface.

4. A button assembly as recited in claim 3, in which the circuit board is supported within the button housing assembly at least in part by the actuator member.

5. A button assembly as recited in claim 3 in which:
a retaining surface is formed on the second housing member; and
the circuit board is supported within the button housing assembly at least in part by the retaining surface.

6. A button assembly as recited in claim 1, in which at least one of the button housing assembly and the actuator member is imprinted with at least one of text and graphics.

7. A button assembly as recited in claim 6, in which at least one of the text and graphics relates to the data stored by the circuit board.

8. A data storage assembly for exchanging data, comprising:
a substrate defining a substrate opening; and
a button assembly, where the button assembly comprises
a button housing assembly defining a perimeter groove;
a circuit board arranged within the button housing assembly, where the circuit board stores data;
a switch element mounted on the circuit board;
an actuator member supported on the button housing assembly, where application of a force to the actuator member causes the actuator member to engage the switch element and form an antenna circuit; whereby the data on the circuit board can be downloaded when the antenna circuit is formed; whereby
the button housing assembly is arranged within the substrate opening such that a substrate opening edge portion is received within the perimeter groove to mechanically secure the button assembly to the substrate.

9. A data storage assembly as recited in claim 8, in which the substrate is selected from a group of substrates consisting of a business card, a rolodex card, and a credit card.

10. A data storage assembly as recited in claim 8, in which at least one of the substrate, the button housing assembly, and the actuator member is imprinted with at least one of text and graphics.

11. A data storage assembly as recited in claim 10, in which at least one of the text and graphics relates to the data stored by the circuit board.

* * * * *